United States Patent [19]

Wright

[11] Patent Number: 4,513,777
[45] Date of Patent: Apr. 30, 1985

[54] PRESSURE COMPENSATED FLOW CONTROL VALVE ASSEMBLY FOR FLUIDS CONTAINING FINELY DIVIDED SOLIDS

[75] Inventor: Dolph D. Wright, Union Lake, Mich.

[73] Assignee: General Motors Corporation, Detroit, Mich.

[21] Appl. No.: 525,127

[22] Filed: Aug. 22, 1983

[51] Int. Cl.³ .............................................. G05D 7/01
[52] U.S. Cl. .................................... 137/501; 137/504
[58] Field of Search ................................. 137/501, 504

[56] References Cited

U.S. PATENT DOCUMENTS

| | | |
|---|---|---|
| 316,626 | 4/1885 | Jackson .................................. 137/501 |
| 2,401,503 | 6/1946 | Paasche . |
| 2,623,331 | 12/1952 | Greening ............................. 137/501 |
| 2,704,553 | 3/1955 | de Verteuil ...................... 137/504 X |
| 3,201,048 | 8/1965 | Gibbs . |
| 3,373,762 | 3/1968 | Korchak . |
| 3,442,288 | 5/1969 | Scaramucci . |
| 3,443,578 | 5/1969 | Hedin . |
| 4,228,958 | 10/1980 | Perry . |
| 4,368,852 | 1/1983 | Sharp . |

*Primary Examiner*—Robert G. Nilson
*Attorney, Agent, or Firm*—William A. Schuetz

[57] ABSTRACT

A pressure compensating flow control valve assembly for providing a constant flow rate for fluids having a high solids content is disclosed. The valve assembly includes a housing comprising first and second housing members having an inlet and an outlet, respectively, a deflectable diaphragm clamped between the housing members and which divides the housing into first and second chambers, and a control valve means carried by the diaphragm which includes a fixed control orifice in communication with the second chamber and outlet and a poppet valve for throttling flow of fluids from the inlet to the first chamber. The control valve means is constructed such that the fluid is caused to be moved in a tortuous path through the valve assembly so as to prevent or minimize solids in the fluid from settling out.

3 Claims, 3 Drawing Figures

PRESSURE COMPENSATED FLOW CONTROL VALVE ASSEMBLY FOR FLUIDS CONTAINING FINELY DIVIDED SOLIDS

The present invention relates to a control valve assembly for fluids and, more particularly, to a pressure compensating control valve assembly for controlling the rate of flow of fluids, such as paints, containing finely divided solids or pigments.

Recirculating paint systems usually include a pressure regulated flow control valve assembly for automatically regulating the rate of flow of the paint to a spray head or gun so as to provide for a uniform application of paint. In one common type of pressure regulated control valve assembly, a spring biased piston sleeve having a control orifice therethrough is slidably and sealably received within the housing and functions to control egress of fluid through outlet passages in the housing downstream of the control orifice. In this type of regulator the piston has one side in communication with the pressurized paint source and its other side in communication with the outlet passages in the housing which in turn are in communication with a spray gun or applicator. The spring in conjunction with pressure on the downstream side of the control orifice biases the piston in opposition to the pressure on the upstream side to position the sleeve relative to the outlet passages. This valve assembly functions to maintain a constant flow rate to the spray gun.

While the above-noted type of valve assembly has been satisfactory in operation, it has disadvantages when used with paints having a high solids content. This is because this type of valve assembly requires a closely fit sliding piston to provide a seal around the control orifice, which fit makes it unsuitable when used with paints having a high solids content.

Another type of pressure regulator employs a spring biased diaphragm for positioning a poppet valve to control fluid to a spray gun. U.S. Pat. No. 4,368,852 shows this type of regulator.

Another disadvantage in the above-noted types of regulator valve assemblies when used with paints having a high solids content is that the path of movement of the paint therethrough is such that the solids can or tend to settle out in cavities therein.

Accordingly, it is an object of the present invention to provide a new and improved pressure compensated flow control valve assembly for providing a constant flow rate for fluids having a high solids content and which utilizes a flexible diaphragm to effect a seal between the higher or lower pressure sides of a control orifice and still provide motion to throttle flow and effect a pressure difference across the control orifice, and in which the fluid is caused to flow in a tortuous path through the valve assembly to prevent or minimize any settling out of the solids in cavities in the valve assembly.

Another object of the present invention is to provide a new and improved pressure compensating flow control valve assembly for providing a constant flow rate for fluids, such as paint, having a high solids content and wherein the valve assembly comprises a housing having first and second housing members having an inlet and an outlet, respectively, a deflectable diaphragm clamped between the housing members and which divides the housing into first and second chambers, and a control valve means carried by the diaphragm which includes a fixed control orifice in communication with the second chamber and outlet and a poppet valve for throttling flow of fluids from the inlet to the first chamber, and wherein the control valve means is constructed and arranged such that the fluid is caused to be moved in a tortuous path through the valve assembly so as to prevent or minimize solids in the fluid from settling out.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
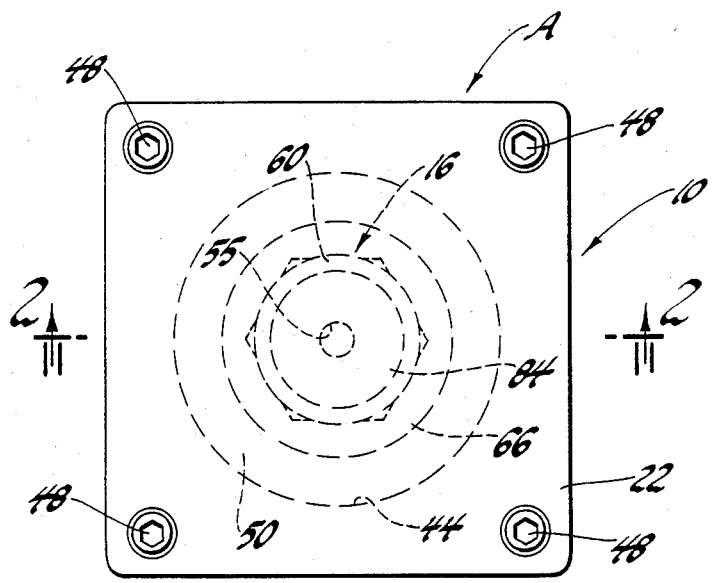
FIG. 1 is a top plan view of the pressure compensating control valve assembly of the present invention.

Referring to the drawings, a novel pressure compensating flow control valve assembly A is thereshown. The valve assembly A is particularly useful for controlling the rate of flow of paints containing a high solids or pigment content in a recirculating type paint system, such as that disclosed in Applicant's copending patent application Ser. No. 525,130, filed Aug. 22, 1983, now Pat. No. 4,497,341.

The control valve assembly A comprises, in general, a housing means 10 having an inlet 12 and an outlet 14, and a control means 16 for controlling the flow of fluid from the inlet 12 to the outlet 14 to provide a constant rate of fluid flow to the outlet.

The housing means 10 is square shaped and includes a first or lower housing member 20 and a second or upper housing member 22. The lower housing member 20 has a central opening 24 which is defined by a side wall 26 having an annular interior side wall surface 28 and a bottom 29 having a bottom interior surface 30. The inlet passage 12 extends through the bottom 29 of the housing member 20 and is in communication with the opening 24. The inlet 12 has a reduced diameter portion 12a adjacent the interior bottom surface 30 so as to define an annular valve seat 34.

The upper housing member 22 is defined by a side wall 40 and a top wall 42. It has a central opening 44 having a first portion 44a which is of the same diameter as the opening 24 in the housing member 20 and a second reduced diameter portion 44b. The opening 44 is in communication with the outlet passage 14, which extends through the side wall 40 of the upper housing member 22.

The housing members 20 and 22 are secured together such that their openings 24 and 44 face each other by four bolts 48 located at the four corners of the housing members 20 and 22, as shown in FIG. 1.

The control means 16 for controlling the flow of fluid from the inlet passage 12 to the outlet passage 14 comprises, in general, a deflectable diaphragm 50 whose outer periphery is clamped between the housing members 20 and 22, and which divides the housing means 10 into first and second chambers or compartments 51 and 52, respectively, a control valve means 54 carried by the deflectable diaphragm 50 and which includes a fixed control orifice 55 in communication with the first and second chambers 51 and 52, a throttling poppet valve 56 for controlling the flow of fluid from the inlet passage 12 to the first chamber 51, and a spring means 60 for biasing the control valve means 54 and diaphragm 50 toward a position in which the poppet valve 56 permits flow of fluid from the inlet passage 12 to the first chamber or compartment 51.

The deflectable diaphragm 50 has a central through opening 65 and is secured along its inner periphery to a pair of washers 66 and 67. The control valve means 54 is annular and comprises upper and lower members 68 and 69, respectively. The lower member 69 has a lower portion 69a and an upper portion 69b. The upper portion 69b is of a lesser diameter than the lower portion 69a and at its juncture with the lower portion 69a defines an annular shoulder 70. The upper portion 69b extends through the washers 67 and 66 and through the opening 65 in the diaphragm 50. The lower valve member 69 has a central axially extending opening 72 and a plurality of transverse openings 74 for communicating the first chamber 51 to the axially extending opening 72. The lower valve member 69 has a bottom 75 which is threadably secured to one end of the headed poppet valve 56. The bottom 75 of the lower valve member 69 also has an axially extending annular skirt 77 adjacent the bottom surface 30 of the housing member 20. The poppet valve 56 is located in the inlet passage 12 and is adapted to seat against the valve seat 34 for closing off communication between the inlet passage 12 and the chamber 51.

The upper valve member 68 is cup-shaped and has an annular side wall 82 and a top or end wall 84. The top wall 84 has a central through opening which defines the fixed, sharp edged control orifice 55. The annular side wall 82 of the upper valve member 68 is internally threaded and threadably receives the externally threaded upper portion 69b of the valve member 69. As can be seen from FIGS. 2 and 3, the upper member 68 and the shoulder 70 of the lower member 69 of the valve means 54 clampingly engage the washers 66 and 67, respectively. The control orifice 55 is in communication with the central through opening 72.

Figure 2:
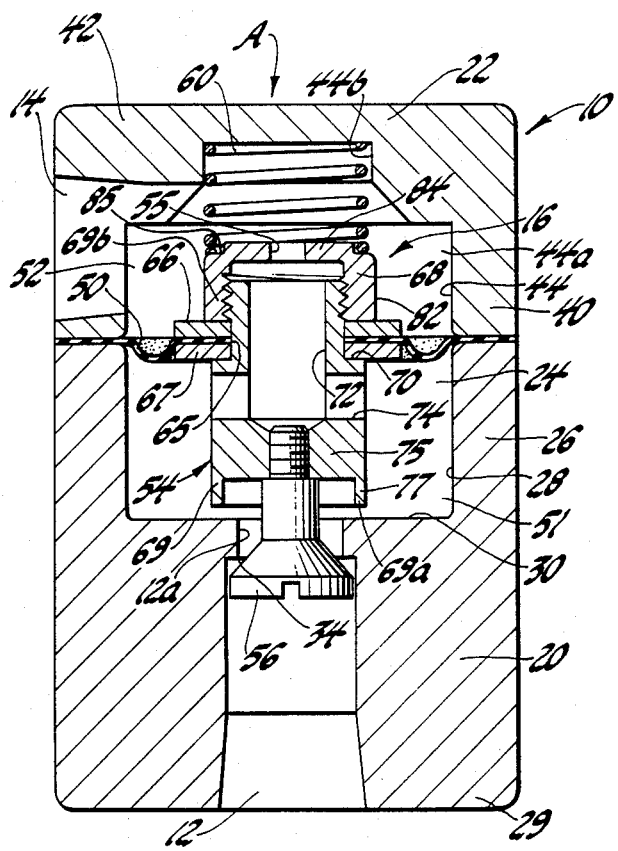
FIG. 2 is a cross-sectional view looking in the direction of the arrows 2—2 of FIG. 1.
Figure 3:
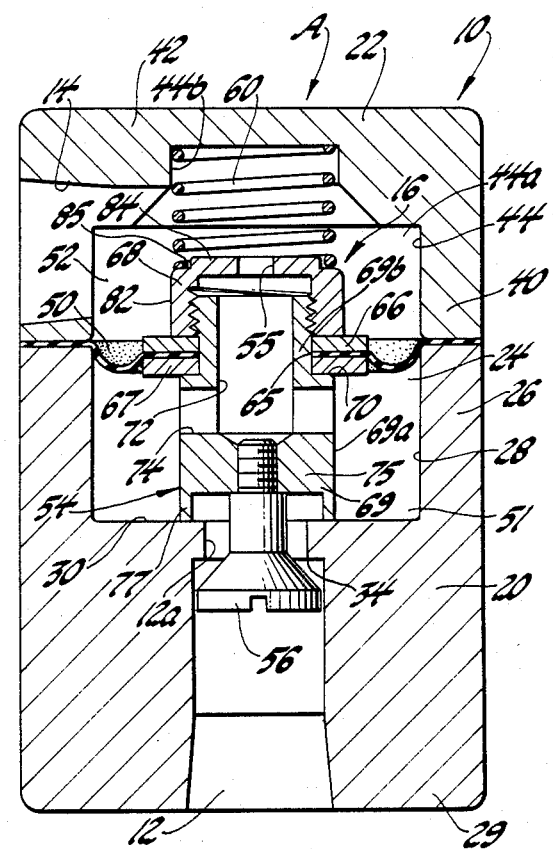
FIG. 3 is a cross-sectional view like that shown in FIG. 2, but showing different parts thereof in different positions.

The spring means 60 comprises a coil spring having one end in abutting engagement with the upper housing member 22 at the end of the opening portion 44b and its other end in abutting engagement with an annular shoulder 85 formed on the upper valve member 68. The spring means 60 functions to bias the diaphragm and control valve means 54 toward a position, as shown in FIG. 2 wherein the poppet valve 56 permits fluid to flow from the inlet 12 to the compartment or chamber 51.

In operation, fluid would be continuously recirculated through the control valve assembly A. The flow of fluid from the inlet passage 12 flows around the poppet valve 56 through opening portion 12a towards the bottom 75 of the lower valve member 69. The fluid flow is then caused to be reversed and flow downwardly and around the skirt 77 and thence laterally into the chamber 51. The fluid then flows upwardly in chamber 51 and then laterally inwardly of the valve member 69 via passages 74. Thence the fluid flows axially upwardly through the axial passage 72 and then through the control orifice 55 into the chamber 52. Fluid then flows from the chamber 52 through the outlet passage 14. When no fluid is circulated through the valve assembly, the spring 60 will bias the control means 16 to the position shown in FIG. 3 in which the skirt 77 engages the bottom surface 30.

The position of the poppet valve 56 is determined by the biasing force of the spring 60 plus the pressure of the fluid in chamber 52 acting on the diaphragm 50 and in opposition to the pressure of the fluid in the chamber 51 acting on the diaphragm 50. The orifice 55 is a sharp-edged orifice and functions to create a pressure drop thereacross between chambers 51 and 52. Being a sharp-edged orifice, it is highly insensitive to the viscosity of the fluid flow. Variation in pressure in chamber 52 will cause the throttling poppet valve 56 to be moved toward or from its valve seat 34, which will result in variation in pressure in chamber 51 as a function of the pressure in chamber 52. This movement of the poppet valve 56 of the valve means 54 will establish a constant difference in pressure across the control orifice 55. This constant pressure difference will result in a constant fluid flow out of the outlet 14 which is a function of the force of the coil spring 60 and the area of the control orifice 55.

From the foregoing, it should be apparent that the above-noted valve assembly A will cause the fluid to flow therethrough at a constant rate of flow and that it will automatically compensate for slight variations in pressure which occur. In addition, it should be noted that by providing a diaphragm as a seal between the upstream and downstream sides of the control orifice 55, that the valve assembly will operate properly even though the fluid or paint will have a high solids content, since there are no closely fit sliding surfaces involved. Moreover, it should be noted that by causing the fluid to flow in a tortuous path through the valve assembly, that the fluid will be agitated as it flows therethrough and thus any settling out of any of the solids in the fluid is prevented or minimized.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A pressure compensating flow control valve assembly for fluids containing finely divided solids like paint comprising:
   a housing means including first and second housing members each having an annular interior side wall and a bottom wall defining an interior bottom surface,
   said housing members being secured together with their respective bottom walls facing each other,
   an inlet passage through said bottom wall of said first housing member, said inlet passage adjacent said interior bottom surface of said first housing member being of a lesser diameter than the diameter of the remaining portion of the passage to define a valve seat,
   an outlet passage in said second housing member,
   a control means for controlling the flow of fluid from the inlet passage to the outlet passage,
   said control means including a deflectable diaphragm whose outer periphery is clamped between the first and second housing members and which defines with said first and second housing members first and second chambers, respectively, a valve means secured to said diaphragm, said valve means having a control orifice in communication with said second chamber, an axially extending passage in communication with said control orifice, transversely extending passages for communicating said axial passage with said first chamber, and a headed valve member disposed within said inlet passage and engageable with said valve seat, said valve means having an annular skirt adjacent said valve seat of said first housing member, spring means having one end in abutting engagement with said bottom wall of said second housing member and the other end in abutting engagement with said valve means, said spring means plus the pressure of the fluid in said second chamber acting in opposition to the pressure of the fluid in said first chamber when fluid is flowing therethrough to normally bias said control means to a position in which said headed valve member is not in engagement with said valve seat to communicate said inlet passage with said first chamber, said control means being operable to maintain a substantially constant rate of flow of fluid through said valve assembly and causing said fluid to flow around the head of said valve member, then around the skirt into the first chamber, then laterally outwardly into the first chamber, then axially and laterally inwardly to said axial passage via said transverse passages in said valve means and then axially through said axial passage and control orifice and thence through said outlet passage whereby said fluid is agitated as it flows through the control valve assembly to minimize any settling out of said solids in said fluid.

2. A pressure compensating flow control valve assembly for use with paints containing finely divided solids comprising:

a housing means including first and second housing members each having an annular interior side wall and a bottom wall defining an interior bottom surface, said housing members being secured together with their respective bottom walls facing each other, an inlet passage through said bottom wall of said first housing member, said inlet passage adjacent said interior bottom surface wall of said first housing member being of a lesser diameter than the diameter of the remaining portion of the passage to define a valve seat, an outlet passage in said second housing member, a control means for controlling the flow of fluid from the inlet passage to the outlet passage, said control means including a deflectable diaphragm whose outer periphery is clamped between the first and second housing members and which defines with said first and second housing members first and second chambers, respectively, a valve means secured to said diaphragm, said valve means including a cup-shaped valve member disposed in said second chamber and whose bottom wall has a control orifice therethrough, a second valve member having a first portion disposed in said first chamber and a reduced diameter second portion extending through a central opening in said diaphragm and secured to said cup-shaped valve member so that said diaphragm around its inner periphery is clamped therebetween, said second valve member having an axial passage in communication with said control orifice, a plurality of transverse passages in communication with said axial passage and said first chamber, said first portion of said second valve member having an annular skirt adjacent said valve seat in said first housing member, and a headed member secured to said second portion of said second valve member and disposed within said inlet passage and engageable with said valve seat, spring means having one end in abutting engagement with said bottom wall of said second housing member and the other end in abutting engagement with said cup-shaped member of said valve means, said spring means plus the pressure of the pain in said second chamber acting in opposition to the pressure in said first chamber when paint is flowing therethrough to normally bias said control means to a position in which said headed valve member is not in engagement with said valve seat to communicate said inlet passage with said first chamber, said control means being operable to maintain a substantially constant rate of flow of fluid through said valve assembly and causing said fluid to flow around the headed valve member, then around the skirt into the first chamber, then laterally inwardly via said transverse passage in said second valve member, then axially through said axial passage and through said control orifice to said outlet passage whereby said fluid flows through a tortuous path and is agitated as it flows through the control valve assembly to minimize any settling out of the solids.

3. A pressure compensating flow control valve assembly for use with paints containing finely divided solids comprising:

a housing means including first and second housing members each having an annular interior side wall and a bottom wall defining an interior bottom surface, said housing members being secured together with their respective bottom walls facing each other, an inlet passage through said bottom wall of said first housing member, said inlet passage adjacent said interior bottom surface wall of said first housing member being of a lesser diameter than the diameter of the remaining portion of the passage to define a valve seat, an outlet passage in said second housing member, a control means for controlling the flow of fluid from the inlet passage to the outlet passage, said control means including a deflectable diaphragm whose outer periphery is clamped between the first and second housing members and which defines with said first and second housing members first and second chambers, respectively, a valve means secured to said diaphragm, said valve means including a cup-shaped valve member disposed in said second chamber and whose bottom wall has a control orifice therethrough, a second valve member having a first portion disposed in said first chamber and a reduced diameter second portion extending through a central opening in said diaphragm and threadably connected to said cup-shaped valve member so that said diaphragm around its inner periphery is clamped therebetween, said second valve member having an axial passage in communication with said control orifice, a plurality of transverse passages in communication with said axial passage and said first chamber and an annular skirt adjacent said inlet passage, and a headed member secured to said second portion of said second valve member and disposed within said inlet passage and engageable with said valve seat, spring means having one end in abutting engagement with said bottom wall of said second housing member and the other end in abutting engagement with said cup-shaped member of said valve means, said spring means plus the pressure of the paint in said second chamber acting in opposition to the pressure in said first chamber when paint is flowing therethrough to normally bias said control means to a position in which said headed valve member is not in engagement with said valve seat to communicate said inlet passage with said first chamber, said control means being operable to maintain a substantially constant rate of flow of fluid through said valve assembly and causing said fluid to flow around the headed valve member, then around the skirt into the first chamber, then laterally inwardly via said transverse passages in said second valve member, then axially through said axial passage and through said control orifice to said outlet passage whereby said fluid flows through a tortuous path and is agitated as it flows through the control valve assembly to minimize any settling out of the solids.

* * * * *